US006904422B2

(12) United States Patent
Calise et al.

(10) Patent No.: US 6,904,422 B2
(45) Date of Patent: Jun. 7, 2005

(54) ADAPTIVE CONTROL SYSTEM HAVING DIRECT OUTPUT FEEDBACK AND RELATED APPARATUSES AND METHODS

(75) Inventors: Anthony J. Calise, Atlanta, GA (US); Naira Hovakimyan, Smyrna, GA (US); Moshe Idan, Haifa (IL)

(73) Assignee: Georgia Tech Research Corporation, Atlanta, GA (US)

( * ) Notice: Subject to any disclaimer, the term of this patent is extended or adjusted under 35 U.S.C. 154(b) by 703 days.

(21) Appl. No.: 09/865,659

(22) Filed: May 25, 2001

(65) Prior Publication Data

US 2002/0099677 A1 Jul. 25, 2002

Related U.S. Application Data

(60) Provisional application No. 60/208,101, filed on May 27, 2000.

(51) Int. Cl.[7] .............................................. G06F 15/18
(52) U.S. Cl. ......................................... 706/23; 706/13
(58) Field of Search ............................. 706/23, 22, 15, 706/14

(56) References Cited

U.S. PATENT DOCUMENTS

| | | | | |
|---|---|---|---|---|
| 5,049,796 A | | 9/1991 | Seraji ..................... 318/568.1 |
| 5,121,467 A | * | 6/1992 | Skeirik ........................ 706/10 |
| 5,142,612 A | * | 8/1992 | Skeirik ........................ 706/23 |
| 5,167,009 A | * | 11/1992 | Skeirik ........................ 706/23 |
| 5,197,114 A | * | 3/1993 | Skeirik ........................ 706/23 |
| 5,224,203 A | * | 6/1993 | Skeirik ........................ 706/23 |
| 5,367,612 A | * | 11/1994 | Bozich et al. ................ 706/23 |
| 5,426,720 A | * | 6/1995 | Bozich et al. ................ 706/23 |
| 5,493,631 A | * | 2/1996 | Huang et al. ................. 706/23 |
| 5,586,221 A | * | 12/1996 | Isik et al. ..................... 706/23 |
| 5,680,513 A | * | 10/1997 | Hyland et al. ................ 706/23 |
| 5,796,920 A | * | 8/1998 | Hyland ........................ 706/20 |
| 5,796,922 A | * | 8/1998 | Smith .......................... 706/23 |
| 5,943,660 A | * | 8/1999 | Yesildirek et al. ............ 706/10 |
| 5,959,861 A | | 9/1999 | Kaneko ........................ 700/29 |
| 6,055,524 A | | 4/2000 | Cheng .......................... 706/23 |
| 6,064,997 A | * | 5/2000 | Jagannathan et al. ......... 706/23 |
| 6,085,183 A | * | 7/2000 | Horn et al. ................... 706/45 |
| 6,351,740 B1 | * | 2/2002 | Rabinowitz .................. 706/22 |
| 6,532,454 B1 | * | 3/2003 | Werbos ........................ 706/14 |
| 6,611,823 B1 | * | 8/2003 | Selmic et al. ................. 706/14 |

OTHER PUBLICATIONS

Chen et al., "Adaptive Control of a Class of Nonlinear Systems using Neural Networks", Proceedings of the 34th Conference o Decision and Control, Dec. 1995.*
McFarland et al., "Robustness Analysis for a Neural Network Based Adaptive Control Scheme", Proceedings of the American Control Conference, Jun. 1995.*
Calise et al., "Design of Optimal Output Feedback Compensators in Two–Time Scale Systems", IEEE Transactions on Automa Control, Apr. 1990.*
Moerder et al., "Near–Optimal Output Feedback Regulation of Ill–Conditioned Linear Systems", IEEE Transactions on Automati Control, May 1988.*

(Continued)

Primary Examiner—Anthony Knight
Assistant Examiner—Michael B. Holmes
(74) Attorney, Agent, or Firm—Alston & Bird LLP

(57) ABSTRACT

An adaptive control system (ACS) uses direct output feedback to control a plant. The ACS uses direct adaptive output feedback control developed for highly uncertain nonlinear systems, that does not rely on state estimation. The approach is also applicable to systems of unknown, but bounded dimension, whose output has known, but otherwise arbitrary relative degree. This includes systems with both parameter uncertainty and unmodeled dynamics. The result is achieved by extending the universal function approximation property of linearly parameterized neural networks to model unknown system dynamics from input/output data. The network weight adaptation rule is derived from Lyapunov stability analysis, and guarantees that the adapted weight errors and the tracking error are bounded.

11 Claims, 10 Drawing Sheets

OTHER PUBLICATIONS

Rysdyk et al., "Robust Adaptive Nonlinear Flight Control Applications Using Neural Networks", Proceedings of the American Control Conference, Jun. 1999.*

McFarland et al., "Robust Adaptive Control Using Single-Hidden-Layer Feedforward Neural Networks", Proceedings of the American Control Conference, Jun. 1999.*

Calise et al., "An SPR Approach for Adaptive Output Feedback Control with Neural Networks", Proceedings of the 40th IEEE Conference on Decision and Control, Dec. 2001.*

Brdys et al., "Recurrent Networks for Nonlinear Adaptive Control", IEE Proceedings-Control Theory and Applications, Mar. 1998.*

Widrow et al., "Adaptive Inverse Control Based on Linear and Nonlinear Adaptive Filtering", Proceedings of the International Workshop on Neural Networks for Identification, Control, Robotics and Signal/Image Processing, Aug. 1996.*

Chen et al., "Adaptive Control of a Class of Nonlinear Discrete-Time Systems Using Neural Networks", IEEE Transactions on Automatic Control, May 1995.*

Hussain et al., "Nonlinear Control With Linearised Models and Neural Networks", 4th International Conference on Artificial Neural Networks, Jun. 1995.*

Hovakimyan et al., "Dynamic Neural Networks for Output Feedback Control", Proceedings of the 38th Conference on Decision and Control, Dec. 1999.*

Yamada et al., "Remarks on an Adaptive Type Self-Tuning Controller Using Neural Networks", 1991 International Conference o Industrial Electronics, Control and Instrumentation, 1991.*

Anthony J. Calise, et al., Adaptive output feedback control of nonlinear systems using neural networks, Automatica, Mar. 7, 2001, pp. 1201–1211, Automatica 37, School of Aerospace Engineering, Georgia Institute of Technology, Atlanta, GA, USA.

Young H. Kim, et al., A Dynamic Recurrent Neural-network-based Adaptive Observer for a Class of Nonlinear Systems, Feb. 18, 1997, pp. 1539–1543, Automatica, vol. 33, No. 8, The University of Texas at Arlington, Fort Worth, Texas & The University of New Mexico, Albuquerque, NM, USA.

F.L. Lewis, Nonlinear Network Structures for Feedback Control, Asian Journal of Control, Dec. 1999, pp. 205–228, vol. 1, No. 4.

Moshe Idan, et al., A Hierarchical Approach to Adaptive Control for Improved Flight Safety, Copyright 2001, pp. 1–11, American Institute of Aeronautics and Astronautics, Reston, VA.

Anthony J. Calise, et al., Development of a Reconfigurable Flight Control Law for the X-36 Tailless Fighter Aircraft, AIAA 2000-3940 Copyright 2000, pp. 1–9, American Institute of Aeronautics and Astronautics, Reston, VA.

Manu Sharma, et al., Neural Network Augmentation of Existing Linear Controllers, AIAA 2001-4163, Copyright 2001, pp. 1–9, American Institute of Aeronautics and Astronautics, Reston, VA.

Naira Hovakimyan, et al. Adaptive Output Feedback Control of a Class of Nonlinear Systems Using Neural Networks, Apr. 23, 2001, pp. 1–21, School of Aerospace Engineering, Georgia Institute of Technology, Atlanta, GA.

Ken-ichi Funahashi, On the Approximate Realization of Continuous Mappings by Neural Networks, Sep. 14, 1988, pp. 183–192, vol. 2, Neural Networks, USA.

G. Cybenko, Approximation by Superpositions of a Sigmoidal Function, Mathematics of Control, Signals, and Systems, Feb. 17, 1989, pp. 303–315, vol. 2, Springer-Verlag New York Inc., USA.

Robert M. Sanner, et al., Gaussian Networks for Direct Adaptive Control, Nov., 1992, pp. 837–863, vol. 3, No. 6, IEEE Transactions on Neural Networks.

Sridhar Seshagiri, et al., Output Feedback Control of Nonlinear Systems Using RBF Neural Networks, Jan., 2000, pp. 69–79, vol. II, No. 1, IEEE Transactions on Neural Network.

Jin Young Choi, et al., Observer-based Backstepping Control Using On-line Approximation, Proceedings of the American Control Conference, Chicago, Illinois, Jun. 2000, pp. 3646–3650.

Kurt Hornik, Multilayer Feedforward Networks are Universal Approximators, Neural Networks, Copyright 1989, pp. 359–366, vol. 2, USA.

J. Horn: "Feedback-Linearization using Neural Process Models" Proceedings of the 9th International Conference on Artificial Neural Networks, vol. 1, Sep. 7, 1999, pp. 37–42, XP001059447 UK, p. 37, right-hand column, line 1–p. 38, right-hand column, line 3.

Y. Zhang et al.: "Stable Neural Controller Design for Unknown Nonlinear Systems Using Backstepping" Proceedings of the 1999 American Control Conference, vol. 2, Jun. 2, 1999, pp. 1067–1071, XP010344848, USA, p. 1067, left-hand column, line 60–p. 1068, right-hand column, line 37.

K. Hasibi: "Implementation of Feedback Linearizable Controllers" Proceedings of the Spie, vol. 1709, 1992, pp. 541–547, XP001059643 USA, p. 541, line 45–p. 542, line 32.

I. Egemen et al.: "Disturbance Attenuating Adaptive Controllers for Parameteric Strict Feedback Nonlinear Systems with Output Measurements" Transactions of the Asme, vol. 121, No. 1, Mar. 1999, pp. 48–57, XP001059617 USA, p. 49, left-hand column, line 46–p. 50, left-hand column, line 57.

Podsiadlo P. et al.: "Output Feedback Adaptive Control of Non-Affine MIMO Systems" Motion Control Proceedings, 1993, Asia-Pacific Workshop on Advances in Singapore Jul. 15–16, 1993, New York, NY, USA, IEEE, pp. 159–164, XP010113424, ISBN: 0–7803–1223–6 the whole document.

Patent Cooperation Treaty, Invitation to Pay Additional Fees with Annex to Form PCT/ISA/206 Communication Relating to the Results of the Partial International Search, Feb. 15, 2002, International Application No. PCT/US01/17201, filed May 25, 2001 by applicant Georgia Tech Research Corporation.

PCT Written Opinion, PCT/US01/17201 (PCT application related to present application) IPEA/EPO mailed Jul. 19, 2002.

PCT International Search Report, PCT/US01/17201 (PCT application related to present application), ISA/EPO Authorized Officer: Mustafa Corapci, mailed Jul. 18, 2002.

Tezcan & Basar, "Disturbance Attenuating Adaptive Controllers for Parametric Strict Feedback Nonlinear Systems with Output Measurements," Transactions of the ASME, vol. 121, pp 48–57 (Mar., 1999).

Zhang & Peng, "Stable Neural Controller Design for Unknown Nonlinear Systems Using Backstepping," Proceedings of the American Control Conf., pp 1067–1071 (Jun., 1999).

* cited by examiner

TRACKING ERROR SIGNAL ANALYSIS

SYSTEM WITHOUT UNMODELLED DYNAMICS AND NN CONTROLLER (a) SYSTEM TRACKING (b) NN OUTPUT $v_{ad}$ AND INVERSION ERROR $\Delta$

SYSTEM WITH UNMODELLED DYNAMICS:
RESPONSE WITH NN CONTROLLER

SYSTEM WITH UNMODELLED DYNAMICS:
RESPONSE WITH NN CONTROLLER AND LINEAR COMPENSATOR (a) SYSTEM TRACKING (b) NN WEIGHT HISTORY

ADAPTIVE CONTROL SYSTEM HAVING DIRECT OUTPUT FEEDBACK AND RELATED APPARATUSES AND METHODS

CROSS-REFERENCE TO RELATED APPLICATION

This application claims priority benefits of U.S. provisional application No. 60/208,101 filed May 27, 2000 naming Anthony J. Calise, Naira Hovakimyan, and Hungu Lee as inventors.

STATEMENT OF GOVERNMENT RIGHTS IN THE INVENTION

This invention was funded in part by the Air Force Office of Scientific Research (AFOSR) under Grant No. F4960-01-1-0024. The United States Government therefore has certain rights in the invention.

FIELD OF THE INVENTION

The invention is directed to a system, apparatuses and methods for adaptively controlling a plant such as an aircraft, automobile, robot, or other controlled system.

BACKGROUND OF THE INVENTION

Research in adaptive output feedback control of uncertain nonlinear dynamic systems is motivated by the many emerging applications that employ novel actuation devices for active control of flexible structures, fluid flows and combustion processes. These include such devices as piezoelectric films, and synthetic jets, which are typically nonlinearly coupled to the dynamics of the processes they are intended to control. Modeling for these applications vary from having accurate low frequency models in the case of structural control problems, to having no reasonable set of model equations in the case of active control of flows and combustion processes. Regardless of the extent of the model accuracy that may be present, an important aspect in any control design is the effect of parametric uncertainty and unmodeled dynamics. While it can be said the issue of parametric uncertainty is addressed within the context of adaptive control, very little can be said regarding robustness of the adaptive process to unmodeled internal process dynamics.

Synthesis approaches to adaptive output feedback control typically make use of state estimation, and therefore require that the dimension of the plant is known. Some approaches further restrict the output to have full relative degree, or restrict the uncertainties in the plant to be an unknown function of the output variables. It would be desirable to remove all these restrictions by adopting a direct output feedback approach that does not rely on state estimation. One of the immediate consequences of such an approach would be that the dimension of the controlled plant need not be known. Consequently, the resulting system would be applicable to plants having both parametric uncertainty and unmodeled dynamics. Furthermore, it would be desirable to produce a control system that is not only robust to unmodeled dynamics, but also learns to interact with and control these dynamics.

Output feedback control of full relative degree systems was introduced by Esfandiari and Khalil, 1992, "Output feedback stabilization of fully linearizable systems," *International Journal of Control*, 56(5):1007–1037. In their publication the authors formulated a control methodology that involves a high gain observer for the reconstruction of the unavailable states. A solution to the output feedback stabilization problem for systems in which nonlinearities depend only upon the available measurement, was given by Praly, L. and Jiang, Z. (1993), "Stabilization by output feedback for systems with iss inverse dynamics," *System & Control Letters*, 21:19–33. Krstic, M., Kanellakopoulos, I., and Kokotovic, P. (1995), *Nonlinear and Adaptive Control Design*, John Wiley & Sons, Inc. New York and Marino, R. and Tomei, P. (1995). *Nonlinear Control Design: Geometric, Adaptive, & Robust*. Prentice Hall, Inc., presented backstepping-based approaches to adaptive output feedback control of uncertain systems, linear with respect to unknown parameters. An extension of these methods due to Jiang can be found in Jiang, Z. (1999), A combined backstepping and small-gain approach to adaptive output feedback control. *Automatica*, 35:1131–1139.

For adaptive observer design, the condition of linear dependence upon unknown parameters has been relaxed by introducing a neural network (NN) in the observer structure of Kim, Y. and Lewis, F. (1998), *High Level Feedback Control with Neural Networks*, World Scientific, N.J. Adaptive output feedback control using a high gain observer and radial basis function neural networks (NNs) has also been proposed by Seshagiri, S. and Khalil, H. (2000), "Output feedback control of nonlinear systems using {RBF} neural networks," *IEEE Transactions on Neural Networks*, 11(1):69–79 for nonlinear systems, represented by input-output models. Another method that involves design of an adaptive observer using function approximators and backstepping control can be found in Choi, J. and Farrell, J. (2000), "Observer-based backstepping control using on-line approximation," *Proceedings of the American Control Conference*, pages 3646–3650. However, this result is limited to systems that can be transformed to output feedback form, i.e., in which nonlinearities depend upon measurement only.

The state estimation based adaptive output feedback control design procedure in the Kim and Lewis 1998 publication is developed for systems of the form:

$$\dot{x}=f(x)+g(x)\delta_c \quad (1)$$

$$y=x \text{ dim } x=\text{dim } y=\text{dim } u, \quad (2)$$

which implies that the relative degree of y is 2. In Hovakimyan, N., Nardi, F., Calise, A., and Lee, H. (1999), "Adaptive output feedback control of a class of nonlinear systems using neural networks," *International Journal of Control* that methodology is extended to full vector relative degree MIMO systems, non-affine in control, assuming each of the outputs has relative degree less or equal to 2:

$$\dot{x}=f(x, \delta_c) \quad (3)$$

$$y=h(x) \text{ dim } y=\text{dim } u \leq \text{dim } x. \quad (4)$$

These restrictions are related to the form of the observer used in the design procedure. Constructing a suitable observer for a highly nonlinear and uncertain plant is not an obvious task in general. Therefore, a solution to adaptive output feedback control problem that avoids state estimation is highly desirable.

SUMMARY OF THE INVENTION

The adaptive control system (ACS) and method of this invention uses direct adaptive output feedback to control a plant. The system can comprise a linear controller (LC) and an adaptive element (AE). The linear controller can be used as a dynamic compensator to stabilize a model of the plant, and provide output regulation. The adaptive element can compensate for disturbances, and modeling error resulting from approximation in modeling of the plant. The adaptive element can comprise a neural network (NN). The adaptive element can receive a signal from the linear controller used to adapt its NN's weights. The input vector to the NN can comprise current and/or past plant output signals together with other available signals. The past plant output signal(s) can be used as inputs to the NN to ensure boundedness of the adaptive element in controlling the plant. The adaptive control system can comprise an error conditioning element having a low-pass filter designed to satisfy a strictly positive real (SPR) condition of a transfer function associated with Lyapunov stability analysis of the control system. The stability analysis can be used to construct the NN adaptation law using only the plant output signal(s) and other available signals as inputs to the NN, and to ensure boundedness of error signal(s) of the closed-loop adaptive control system. Apparatuses forming components of the ACS are also disclosed.

A method of the invention comprises generating at least one control signal $\delta_c$ to regulate a plant output signal y by feedback of the plant output signal y, and optionally other sensed variables related to the state of the plant, in which y is a function of the plant state having known but unrestricted relative degree r. The control signal $\delta_c$ can be generated so as to control the plant based on an approximate dynamic model, and so as to control the plant in the presence of unmodeled dynamics in the plant based on an adaptive control technique. The adaptive control technique can be implemented with a neural network. Related methods are also disclosed.

These together with other objects and advantages, which will become subsequently apparent, reside in the details of construction and operation of the invented system, methods, and apparatuses as more fully hereinafter described and claimed, reference being made to the accompanying drawings, forming a part hereof, wherein like numerals refer to like parts throughout the several views.

DETAILED DESCRIPTION OF THE INVENTION

Figure 1:
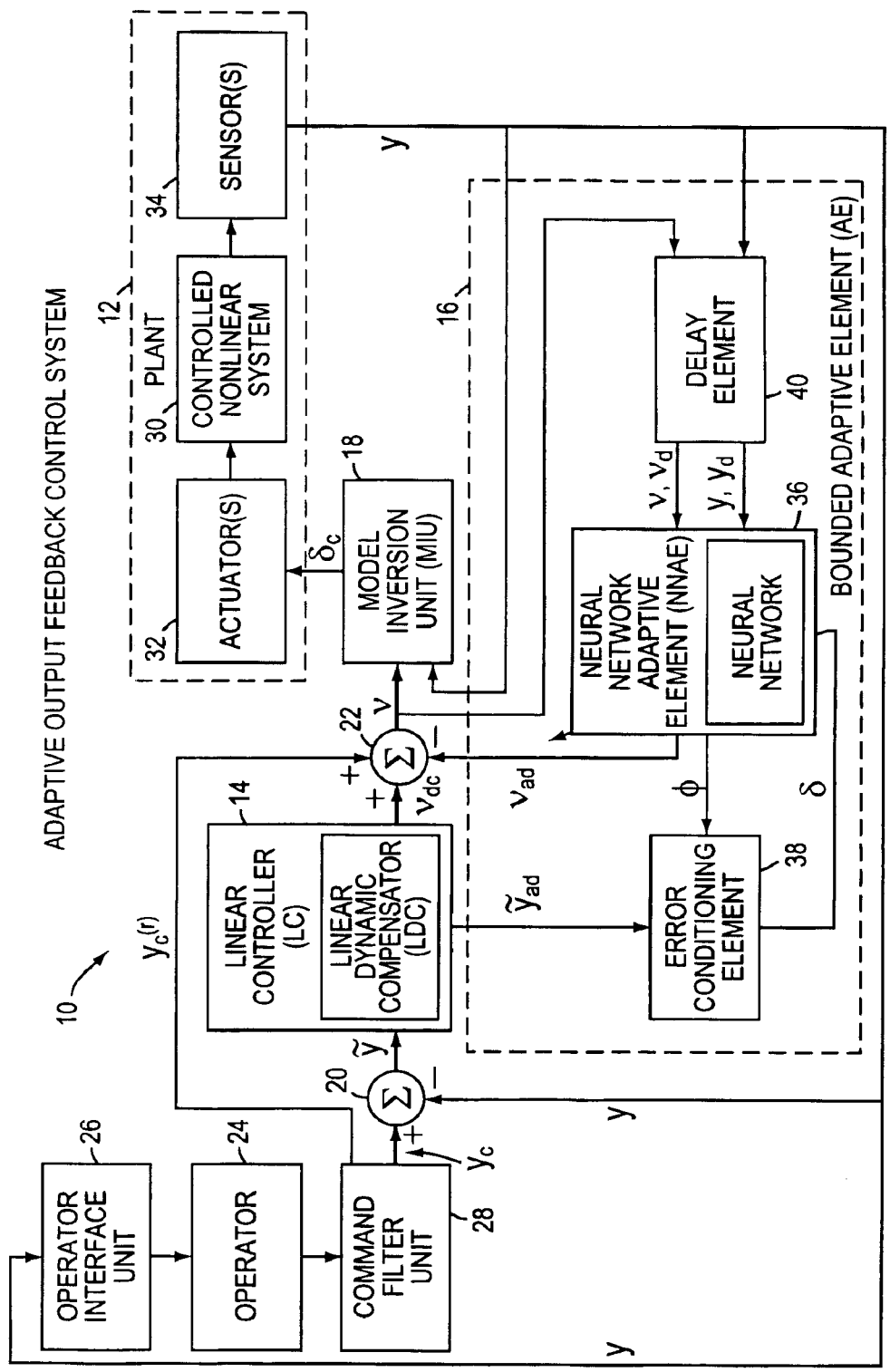
FIG. 1 is a general block diagram of an adaptive control system for controlling a plant based on a plant output signal y in accordance with the invention.

As used herein, the following terms have the following definitions:

"Actuator" can be virtually any device capable of affecting the state of a plant to control one or more degrees of freedom thereof. Such actuator can be a motor, motor-driven screw, a hydraulic cylinder, a pump or valve controlling a stream of air, a thermal heater, a compressor or suction generator, or other device.

"Adaptive control system" means a control system having the capability to adapt to changes in a controlled plant or its environment over time.

"And/or" means either one or both of the elements before and after this term. Hence, "A and/or B" means "A" or "B" or "A and B".

"Direct output feedback" refers to a control system, apparatus or method that employs feedback of an "output" that is a function of the fall state(s) existing in a plant. "Direct" refers to the fact that no state estimation is used to estimate plant states not present in or not derivable from the "output".

"Operator" can be a human or computer, that receives and input and generates and output based on the current and past history of the input., for example, senses a plant output using a plant output signal, and generates a commanded state signal to control the plant.

"Memory" can be a random-access memory (RAM), read-only memory (ROM), erasable read-only programmable memory (EPROM), or other memory device capable of storing a control program and data executable by a processor.

"Plant" refers to a system controlled by a control system. For example, the plant can be an aircraft, spacecraft, space-launch vehicle, satellite, missile, guided munition, automobile, or other vehicle. The plant can also be a robot, or a pointing or orientation system such as a satellite orientation system to orient power-generation panels, a transceiver, or a docking mechanism. Such plant can also be a braking system, an engine, a transmission, or an active suspension, or other vehicle subsystem. The plant can be a manufacturing facility or a power generation facility. In general, the plant could be virtually any controllable system.

"Processor" can be a microprocessor such as a Xeon® or Pentium® brand microprocessor produced by Intel® Corporation, an Athlon® brand microprocessor commercially available from AMD® Corporation, Sunnyvale, Calif., which can operate at one (1) megahertz or more, a microcontroller, a field programmable gate array ("FPGA"), a programmable logic array ("PLA"), a programmed array logic ("PAL"), or other type of data processing or computing device.

"Relative degree" applies to a regulated variable (such as plant output signal y) and corresponds to the number of times the variable must be differentiated with respect to time before an explicit dependence on the control variable (such as the command control signal $\delta_c$) is revealed.

"Sensor" can be virtually any device(s) for sensing a degree of freedom of a plant's state, whether alone or in combination with one or more other sensors. The sensor can be virtually any device suitable for sensing information regarding a plant's state. For example, the sensor could be a gyroscope for detecting orientation of a vehicle such as an aircraft, i.e., pitch or roll attitudes or side slip. The sensor can also be a temperature or pressure sensor, a position, velocity, or inertial sensor.

"(s)" means one or more of the thing meant by the word preceding "(s)". Thus, basis function(s) means one or more basis functions.

"State" refers to a property of a plant to be controlled which is sufficient to completely define the condition of the plant at any time instant. For example, elements of the state can be a position, velocity, acceleration, mass, energy, temperature, pressure, volume, etc. of an object associated with a plant that is to be controlled.

"State feedback" pertains to a situation in which the entire state of the plant can be sensed and used to control the plant through feedback.

"Strictly positive real" is a property that pertains to the transfer function of a linear time-invariant system. The transfer function, G(s), is a ratio of polynomials in the variable, 's', which is a complex variable having a real and imaginary part. Let s=a+jb, were a is the real part and b is the imaginary part. Then the transfer function is called 'Strictly Positive Real' if the following two conditions are satisfied:
1) G(s) is asymptotically stable (all the poles of G(s) have real parts <0); and
2) G(jb)>0 for all values of the real variable 'b'. This definition can be found in Khalil, H. K., "Nonlinear Systems, Second Edition, Prentice-Hall, 1996, p. 404.

"Variable" refers to any signal that can be changed independently of the plant states, such as the control variable, or that dependent upon time either directly, or indirectly because it depends upon plant states that are time varying, such as the output variable.

1. General Description of Adaptive Control System and Method

As shown in FIG. 1, an adaptive control system (ACS) 10 can be used to control a plant 12 using 'direct output feedback' as opposed to 'state feedback.' In contrast, the disclosed adaptive control system 10 uses 'direct output feedback' in which a function of the full plant state, as opposed to all plant states or estimates thereof, is used for feedback control of the plant 12. The adaptive control system 10 of this invention is therefore highly useful in the control of plants, especially non-linear plants in which the full state of the plant cannot be sensed through practical or economically-feasible devices or techniques, particularly if the plant contains unmodeled or unknown dynamics.

In FIG. 1, the ACS 10 comprises a linear controller (LC) 14, stable adaptive element (AE) 16, and model inversion unit (MIU) 18. The ACS 10 can further comprise error signal generator (ESG) 20 and summing unit 22. The ACS 10 can further comprise an operator 20, operator interface unit 22, and command filter unit 24. These elements permit the operator 22, which can be human or machine, to interact with ACS 10 to control the plant 18. The plant 12 comprises a system 30 to be controlled. In general, the system 30 is a non-linear system, although it can be linear. The linear controller 14 is implemented to affect approximate control of the plant, optionally using linear control. The AE 16 serves to implement adaptive control of nonlinearities of the plant 12 that are not compensated by the linear controller 14. The combined effect of the LC 14 and AE 16 is used to control the plant 12.

The ACS 10 is now described in further detail. The operator interface unit 26 is coupled to receive the plant output signal y which, as previously described, is a function of the full state of plant 12 having known but unrestricted relative degree r in which r is the number of times the plant output signal y must be differentiated in order for the corresponding control variable, $\delta_c$, to become explicit. The operator interface unit 26 can be an electronic interface between an ACS bus and the operator 24 if implemented as a processor, for example, or can be a display, gauge, meter, light, or other indicator if the operator 24 is human. The operator 24 generates command signals based on the plant output signal y from the operator interface unit 26. The operator 24 generates a command action or command signal based on the plant output signal y. The operator 24 supplies the command action or command signal to the command filter unit 28 that generates filtered commanded signals $y_c$ and $y_c^{(r)}$ based thereon. The integer r denotes the relative degree of the regulated variable, and signal $y_c^{(r)}$ denotes the $r^{th}$ derivative with respect to time of the filtered commanded signal $y_c$. The command filter unit 28 is coupled to supply the filtered commanded signal $y_c$ to the error signal generator 20. The error signal generator 20 is also coupled to receive the plant output signal y. Based on the filtered commanded signal $y_c$ and the plant output signal y, the error signal generator 20 generates a tracking error signal $\tilde{y}$. The error signal generator 20 is coupled to supply the tracking error signal $\tilde{y}$ to the linear controller 14.

The linear controller 14 generates a pseudo-control component signal $v_{dc}$ based on the tracking error signal $\tilde{y}$ by operating on such error signal with a summing node, feedback network, and gain multipliers implementing the transfer function $N_{dc}(s)/D_{dc}(s)$. The linear controller 14 also generates a transformed signal $\tilde{y}_{ad}$ based on the tracking error signal $\tilde{y}$ by operating on such error signal with a summing node, one or more integrators, and a feedback network from output terminal(s) of the integrator(s) that have gain multiplier(s) implementing the transfer function $N_{ad}(s)/D_{dc}(s)$. The linear controller 14 generates the transformed signal $\tilde{y}_{ad}$ so that the transfer function from the transformed signal $\tilde{y}_{ad}$ to the adaptive control signal $v_{ad}$ is strictly positive real (SPR). The linear controller 14 is coupled to supply the transformed signal $\tilde{y}_{ad}$ to the AE 16.

More specifically, the error conditioning element 38 of the AE 16 is coupled to receive the transformed signal $\tilde{y}_{ad}$. The error conditioning element 38 is also coupled to receive basis function(s) $\phi$ and generates the training signal $\delta$ based on the signal $\tilde{y}_{ad}$ and the basis function(s). The error conditioning element 38 can generate the training signal $\delta$ by filtering the basis function(s) $\phi$ and multiplying the resulting signal $\phi_f$ by the transformed signal $\tilde{y}_{ad}$. The error conditioning element 38 is coupled to supply the training signal $\delta$ to the neural network adaptive element (NNAE) 36.

The NNAE 36 uses the training signal $\delta$ to adjust connection weights W of its neural network to adapt to plant dynamics that are unmodeled and therefore not adapted to by the LC 14. The delay element 40 of the AE 16 is coupled to receive the pseudo-control signal v and the plant output signal y and is coupled to supply non-delayed signals v, y, and delayed versions $v_d$, $y_d$ thereof generated by the delay element 40 based on the signals v, y to the NNAE 36. The delayed signals $y_d$ are delayed relative to the plant output signal y by time delay increments d to (n−1)·d, n being the number of the full plant states, although in practice fewer or more such delays may be used. The delayed signal(s) $v_d$ are delayed relative to the pseudo-control signal v by time delay increments d to (n−r−1)·d, r being the relative degree. The use of these delayed signals assures that the weight coefficient(s), W, and error signal(s) ỹ are bounded so that the ACS 10 is stable.

Based on the connection weight(s) W determined by training signal δ, and the pseudo-control signal v and delayed version(s) $v_d$ thereof and/or the plant output signal y and delayed version(s) $y_d$ thereof supplied as inputs to the NNAE 36, the NNAE generates the adaptive control signal $v_{ad}$. The NNAE 36 is coupled to supply the adaptive control signal $v_{ad}$ to the summing unit 22. The summing unit 22 is also coupled to receive the pseudo-control component signal $v_{dc}$ from the linear controller 14 and the r-th time derivative of the commanded state signal $y_c^{(r)}$ from the command filter unit 28. Based on the signals $y_c^{(r)}$, $v_{dc}$, $v_{ad}$, the summing unit 22 generates the pseudo-control signal v. The summing unit 22 is coupled to supply the pseudo-control signal v to the model inversion unit 18.

The model inversion unit 18 is also coupled to receive the plant output signal y. The model inversion unit 18 generates a command control signal $\delta_c$ based on the pseudo-control signal v and the plant output signal y. More specifically, the model inversion unit 18 subjects the signals v, y to a function that inverts the linear control model implemented by the linear controller 14, to produce the command control signal $\delta_c$. The model inversion unit 18 is coupled to supply the resulting command control signal $\delta_c$ to the actuator(s) 32 of the plant 12. The actuator(s) 32 are coupled to or associated with the controlled nonlinear system 30 so that the control the state(s) of such system, based on the command control signal $\delta_c$. The sensor(s) 34 are coupled or associated with the controlled nonlinear system 30, and generates the plant output signal y that is a function of the full plant state(s) of the controlled nonlinear system 30.

Model inversion in the unit 18 can be performed in the following way. For the scalar case (p=1) if the regulated output, y, has relative degree r, then the output equation can be differentiated r times with respect to time until the control appears explicitly. In this case, we assume that we have a model of this $r^{th}$ derivative $$y^{(r)} = \hat{h}_r(y, \delta_c) = v \quad (5)$$

Thus the model inversion of the unit 18 is defined by $$\delta_c = \hat{h}_r^{-1}(y, v). \quad (6)$$

2. Specific Description of Adaptive Control System and Method

Let the dynamics of an observable nonlinear single-input-single-output (SISO) system be given by the following equations:

$$\dot{x} = f(x, \delta_c), \; y = h(x) \quad (7)$$

where $x \in \Omega \subset \Re^n$ is the state of the system, $\delta_c$, $y \in \Re$ are the system input (control) and output (measurement) signals, respectively, and $f(\cdot,\cdot), h(\cdot) \in C^\infty$ are unknown functions. Moreover, n need not be known.

To ensure proper operation, the following assumption is made in the implementation of the ACS 10.

Assumption 1. The dynamical system of Eq. (7) satisfies the output feedback linearization conditions Isidori, A. (1995), Nonlinear Control Systems, Springer-Verlag, Inc. with relative degree r, i.e., $$y^{(r)} = h_r(x, \delta_c). \quad (8)$$

Here, $h_r \triangleq \dfrac{d^r h}{dt^r}$, such that $\dfrac{\partial h_i}{\partial u} = 0$ for $0 \le i < r$ and $\dfrac{\partial h_r}{\partial u} \ne 0$.

This disclosure addresses the design of an output feedback control law that utilizes the available measurement y(t), to obtain system output tracking of a bounded trajectory $y_c(t)$ that is assumed to be r-times differentiable, i.e., $y_c \in C^r$. The difference between unknown dynamics function $h_r$ and its estimate $\hat{h}_r$, or the modeling error, is mapped using a NN. This mapping has to be based on measured input and output data only. To this end, the universal approximation property of neural networks and the observability of the system are utilized to construct this mapping on-line using measured input/output time histories. These various features of the proposed control design scheme are presented in the next section.

3. Controller Design
3.1 Feedback Linearization

Feedback linearization is performed by introducing the transformation $$v = \hat{h}_r(y, \delta_c), \quad (9)$$

where v is commonly referred to as a pseudo control signal, and $\hat{h}_r(y, \delta_c)$ is the best available approximation of $h_r(x, \delta_c)$. Then, the system dynamics can be expressed as $$y^{(r)} = v + \Delta', \quad (10)$$

where $$\Delta' = \Delta'(x, \delta_c) = h_r(x, \delta_c) - \hat{h}_r(y, \delta_c). \quad (11)$$

Using this transformation, Eq. (10) represents the dynamic relation of r integrators between the pseudo-control signal v and the plant output signal y, where the error Δ' acts as a disturbance signal. Assuming that the plant output signal y is required to track a known bounded input command signal $y_c$, the pseudo-control signal v is chosen to have the form $$v = y_c^{(r)} + v_{dc} - v_{ad}, \quad (12)$$

where $v_{dc}$ is the output of a stabilizing linear dynamic compensator for the linearized dynamics in Eq. (10) with Δ'=0, and $v_{ad}$ is the adaptive control signal designed to approximately cancel Δ'. The r-th derivative of the input signal, $y_c^{(r)}$, is introduced as a feedforward term to condition the error dynamics. This derivative can be easily obtained if the tracking (or command) signal $y_c$ is generated using an r-th (or higher) order reference model forced by an external input. The reference model serves to define the desired response of the closed loop system. The input to the dynamic compensator is the tracking error, which is defined by $$\tilde{y} = y_c - y. \quad (13)$$

It is important to point out that the model approximation function $\hat{h}_r(\cdot,\cdot)$ should be defined so that it is invertible with respect to u, allowing the actual control input to be computed by $$\delta_c = \hat{h}_r^{-1}(y,v). \quad (14)$$

Clearly, the accuracy of the approximation $h_r(x,\hat{h}_r^{-1}(y,v)) \approx v$ is governed by $$\Delta'(x,\delta_c) = \Delta(x,y,v) = h_r(x,\hat{h}_r^{-1}(y,v)) - v. \quad (15)$$

From Eq. (11) and Eq. (15), notice that $\Delta$ depends on $v_{ad}$ through $v$, whereas $v_{ad}$ has to be designed to cancel $\Delta$. The following assumption is introduced to guarantee existence and uniqueness of a solution for $v_{ad}$:

Assumption 2. The map $v_{ad} \mapsto \Delta$ is a contraction over the entire input domain of interest.

Using Eq. (11), the condition in Assumption 2 implies:

$$\left|\frac{\partial \Delta}{\partial v_{ad}}\right| = \left|\frac{\partial(h_r - \hat{h}_r)}{\partial u}\frac{\partial \delta_c}{\partial v}\frac{\partial v}{\partial v_{ad}}\right| = \left|\frac{\partial(h_r - \hat{h}_r)}{\partial u}\frac{\partial \delta_c}{\partial \hat{h}_r}\right| < 1 \quad (16)$$

which can be re-written in the following way:

$$\left|\frac{\partial h_r/\partial \delta_c}{\partial \hat{h}_r/\partial \delta_c} - 1\right| < 1 \quad (17)$$

The condition (17) is equivalent to the following two conditions $$sgn(\partial h_r/\partial \delta_c) = sgn(\partial \hat{h}_r/\partial \delta_c) \quad (1)$$

$$|\partial \hat{h}_r/\partial \delta_c| > |\partial h_r/\partial \delta_c|/2 > 0. \quad (2)$$

The first condition means that control reversal is not permitted, and the second condition places a lower bound on the estimate of the control effectiveness in (14).

3.2 Control System Architecture

Based on the above description, the overall control system architecture is presented in FIG. 1. The central components of the system are: (a) the model inversion/linearization unit 18 implementing block $\hat{h}_r^{-1}(y,\delta_c)$, (b) the adaptive neural network based element 16 is designed to minimize the effect of $\Delta$, and (c) the linear dynamic compensator of the linear controller 14. The input into the ACS 10 is the reference command tracking signal $y_c$ and its r-th derivative $y_c^{(r)}$, generated by, e.g., a reference model forced by an external input.

It is important to note the two output signals $(v_{dc}, \tilde{y}_{ad})$ of the linear compensator. The pseudo-control component signal, $v_{dc}$, is designed to stabilize the linearized system, as described earlier. The transformed signal, $\tilde{y}_{ad}$, is a linear combination of the compensator states and its input, i.e., the tracking error signal $\tilde{y}$. This signal is generated to ensure an implementable error signal $\delta$ that is used to adapt the NN weights W of the NNAE 36.

3.3 Tracking Error Signal Analysis

The analysis presented in this subsection is carried out to facilitate the design of the NNAE 36 and the second output signal $\tilde{y}_{ad}$ of the linear dynamic compensator 14. To formulate the overall tracking error dynamics of the controlled system, the specific choice of the pseudo-control signal $v$ is given by Eq. (12) is substituted into Eq. (16), leading to $$y^{(r)} = y_c^{(r)} + v_{dc} - v_{ad} + \Delta, \quad (18)$$

or alternatively $$\tilde{y}^{(r)} = -v_{dc} + v_{ad} - \Delta. \quad (19)$$

Figure 2:
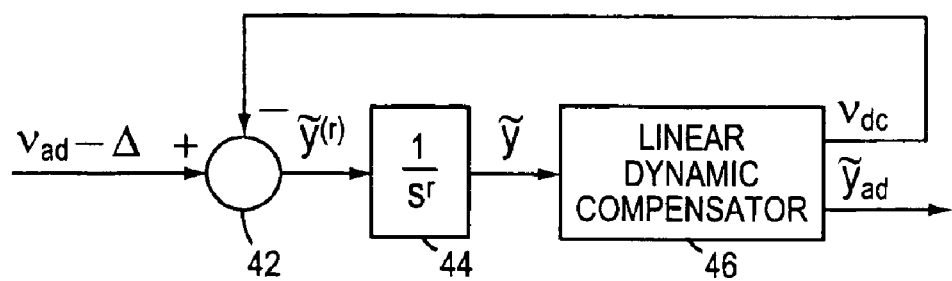
FIG. 2 is a schematic diagram of the adaptive control system reduced to elements relevant to tracking error signal analysis.
Figure 3:
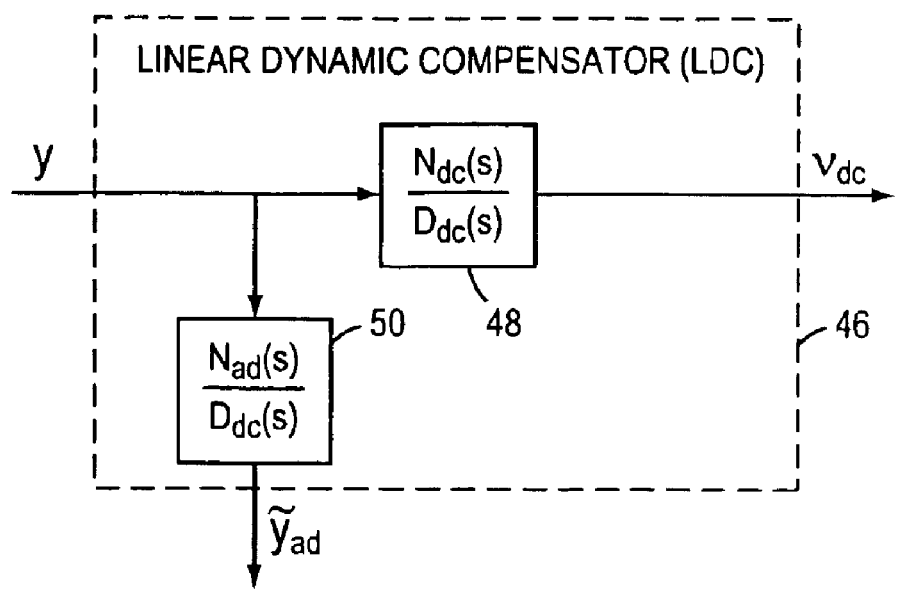
FIG. 3 is a relatively detailed view of a linear dynamic compensator of the adaptive control system.

These error dynamics are depicted schematically in FIG. 2. More specifically, under tracking error dynamics analysis, the ACS 10 reduces to a summing node 42, an integrator 44, and a linear dynamic compensator (LDC) 46. The summing node 42 is coupled to receive the signal $v_{ad}-\Delta$ and the pseudo-control component signal $v_{dc}$. The summing node 42 subtracts the signal $v_{dc}$ from the signal $v_{ad}-\Delta$ to generate the signal $\tilde{y}^{(r)}$. The r-th degree integrator 44 integrates the signal $\tilde{y}^{(r)}$ to produce the signal $\tilde{y}$. The LDC 46 is coupled to receive the signal $\tilde{y}$ from the integrator 44. Based on the signal $\tilde{y}$, the LDC 46 generates the signal $v_{dc}$ that is fedback to the summing node 42. The LDC 46 also generates the signal $\tilde{y}_{ad}$ based on the signal $\tilde{y}$. The LDC 46 implements a transfer function that is SPR to map the signal $\tilde{y}$ to the signal $v_{ad}-\Delta$ to ensure stability of the ADC 10.

The single-input two-output transfer matrix of the linear dynamic compensator is denoted by $$\left\{\begin{array}{c}v_{dc}(s)\\ \tilde{y}_{ad}(s)\end{array}\right\} = \frac{1}{D_{dc}(s)}\left[\begin{array}{c}N_{dc}(s)\\ N_{ad}(s)\end{array}\right]\tilde{y}(s) \quad (20)$$

where s represents the complex Laplace variable. The LDC 46 can comprise transfer function elements 48, 50. The transfer function element 48 can be used to implement the transfer function $N_{dc}(s)/D_{dc}(s)$ mapping the signal $\tilde{y}$ to the signal $v_{dc}$. The transfer function element 50 can be used to implement the transfer function $N_{ad}(s)/D_{dc}(s)$ map the signal $\tilde{y}$ to the signal $\tilde{y}_{ad}$. Further details regarding the LDC 46 are described below.

Assumption 3. The linearized system in FIG. 2 is stabilized using a stable linear dynamic compensator 46, i.e., the roots of the denominator polynomial $D_{dc}(s)$ are located in the open left half plane of the complex plane s.

Since the linearized system dynamics, and hence the error dynamics, consist of r pure integrators, this assumption introduces only a very mild restriction on the design. Based on the compensator defined in Eq. (20), the closed loop transfer function of the system depicted in FIG. 2 is given by:

$$\tilde{y}_{ad}(s) = \frac{N_{ad}(s)}{s^r D_{dc}(s) + N_{dc}(s)}(v_{ad} - \Delta)(s)\underline{\Delta}G(s)(v_{ad} - \Delta)(s). \quad (21)$$

Analyzing the denominator of Eq. (21), the Routh-Hurwitz stability criterion implies that a necessary condition for closed loop system stability is that the degree of the compensator numerator, $N_{dc}(s)$, and hence of its denominator, $D_{dc}(s)$, should be at least (r−1), i.e., $$q\underline{\Delta}deg(D_{dc}(s)) \geq deg(N_{dc}(s)) \geq r-1. \quad (22)$$

This dictates the design of the linear dynamic compensator $$v_{dc}(s) = \frac{N_{dc}(s)}{D_{dc}(s)}\tilde{y}(s), \quad (23)$$

which can be carried out using any linear control design technique (classical, pole placement, optimal LQ, etc.), with the constraint of assumption 3. The numerator $N_{ad}(s)$, associated with the output $\tilde{y}_{ad}$, does not affect the stability of the error system of FIG. 2.

3.4 Neural Network Based Approximation

The term "artificial neural network" has come to mean any architecture that has massively parallel interconnections of simple "neural" processors. Given $x \in R^{N_1}$, a three layer-layer NN has an output given by:

$$y_i = \sum_{j=1}^{N_2} \left[ w_{ij} \phi \left( \sum_{k=1}^{N_1} v_{jk} x_k + \theta_{vj} \right) + \theta_{wi} \right], \quad i=1,\ldots,N_3 \qquad (24)$$

where $\phi(\bullet)$ is the activation function, $v_{jk}$ are the first-to-second layer interconnection weights, and $w_{ij}$ are the second-to-third layer interconnection weights. $\theta_{vj}$ and $\theta_{wj}$ are bias terms. Such an architecture is known to be a universal approximator of continuous nonlinearities with squashing activation functions. See Funahashi, K. (1989), On the approximate realization of continuous mappings by neural networks. *Neural Networks*, 2:183–192; Hornik, K., Stinchcombe, M., and White, H. (1989), Multilayer feedforward networks are universal approximators, *Neural Networks*, 2:359–366.

Linearly parameterized neural networks $$y = W^T \phi(x) \qquad (25)$$

are universal approximators as well, if vector function $\phi(\bullet)$ can be selected as a basis over the domain of approximation. Then a general function $f(x) \in C^k$, $x \in D \subset \mathfrak{R}^n$ can be written as $$f(x) = W^T \phi(x) + \epsilon(x), \qquad (26)$$

where $\epsilon(x)$ is the functional reconstruction error. In general, given a constant real number $\epsilon^* > 0$, $f(x)$ is within $\epsilon^*$ range of the NN, if there exist constant weights $W$, such that for all $x \in \mathfrak{R}^n$ Eq.(20) holds with $\|\epsilon\| < \epsilon^*$.

Definition 1. The functional range of NNAE 36 is dense over a compact domain $x \in D$, if for any $f(\bullet) \in C^k$ and $\epsilon^*$ there exists a finite set of bounded weights $W$, such that Eq. (26) holds with $\|\epsilon\| < \epsilon^*$.

Various publications show that the functional range of NN in Eq. (25) is dense for different activation functions $\phi(\bullet)$. See Cybenko, G. (1989) publication. Approximation by superpositions of sigmoidal function, *Mathematics of Control, Signals, Systems*, 2(4):303–314; Park, J. and Sandberg, I. (1991), Universal approximation using radial basis function networks, *Neural Computation*, 3:246–257; Sanner, R. and Slotine, J. (1992), Gaussian networks for direct adaptive control, *IEEE Transactions on Neural Networks*, 3(6):837–864.

The following theorem extends these results to map the unknown dynamics of an observable plant from available input/output history.

Theorem 1. Given $\epsilon^* > 0$, there exists a set of bounded weights $W$, such that $\Delta(x,y,v)$, associated with the system (1)–(5), can be approximated over a compact domain $D \subset \Omega \times R$ by a linearly parameterized neural network $$\Delta = W^T \phi(\eta) + \epsilon(\eta), \quad \|\epsilon\| < \epsilon^* \qquad (27)$$

using the input vector $$\eta(t) = [1 \bar{v}_d^T(t) \bar{y}_d^T(t)]^T, \qquad (28)$$

where $$\bar{v}_d^T(t) = [v(t)v(t-d) \ldots v(t-(n_1-r-1)d)]^T$$

$$\bar{y}_d^T(t) = [y(t)y(t-d) \ldots y(t-(n_1-1)d)]^T$$

with $n_1 \geq n$ and $d > 0$, provided there exists a suitable basis of activation functions $\phi(\bullet)$ on the compact domain $D$.

The output of the adaptive element 16 in FIG. 1 is designed as $$v_{ad} = \hat{W}^T \phi(\eta), \qquad (29)$$

where $\hat{W}$ are the estimates of the weights. Eq. (29) will always have at least one fixed-point solution, so long as $\phi(\bullet)$ is made up of bounded basis functions.

3.5 Construction of SPR Transfer Function

As discussed earlier, the second output of the linear dynamic compensator 46, $\tilde{y}_{ad}$, will be used to construct the rule for adapting $\hat{W}$ in Eq. (29). Using Eqs. (27) and (29) in Eq. (21) implies:

$$\tilde{y}_{ad}(s) = G(s)(\tilde{W}^T \phi(\eta) - \epsilon) \qquad (30)$$

where $\tilde{W} = \hat{W} - W$ is the weight error. As will be seen in the next section, for the NN adaptation rule to be realizable, i.e. dependent on available data only, the transfer function $G(s)$ must be strictly positive real (SPR). However, the relative degree of $G(s)$ is at least r. When the relative degree of $G(s)$ is one, it can be made SPR by a proper construction of $N_{ad}(s)$. If $r > 1$, $G(s)$ cannot be SPR through this technique alone.

To achieve SPR in the $r > 1$ case, following the Kim and Lewis, 1998 publication, a stable low pass filter $T^{-1}(s)$ is introduced in Eq. (30) as:

$$\tilde{y}_{ad}(s) = G(s)T(s)(\tilde{W}^T \phi_f + \delta - \epsilon_f)(s) \qquad (31)$$

where $\phi_f$ and $\epsilon_f$ are the signals $\phi$ and $\epsilon$, respectively, after being filtered through $T^{-1}(s)$, and $\delta_m(s)$ is the "so-called" mismatch term given by $$\delta_m(s) = T^{-1}(s)(\tilde{W}^T \phi) - \tilde{W}^T \phi_f \qquad (32)$$

that can be bounded as $$\|\delta_m(t)\| \leq c\|\tilde{W}\|_F, \quad c > 0. \qquad (33)$$

The numerator of the transfer function $G(s)T(s) = \overline{G}(s)$ in Eq. (31) is $T(s)N_{ad}(s)$. The polynomial $T(s)$ is Hurwitz, but otherwise can be freely chosen, along with the numerator polynomial $N_{ad}(s)$ of Eq. (21) that defines the output $\tilde{y}_{ad}$. Hence, the numerator polynomial (or the zeros) of $\overline{G}(s)$ can be freely chosen to make it SPR. Two approaches can be utilized in constructing $T(s)$ and $N_{ad}(s)$ to make $\overline{G}(s)$ SPR. To avoid an unrealizable feedthrough, $\overline{G}(s)$ will be assigned $(r+q-1)$ zeros, thus making it relative degree one.

Zero placement approach: Since $\overline{G}(s)$ is a stable transfer function, its zeros can be easily placed to make it SPR, e.g., by interlacing them with its poles. From Bode plot analysis it is easy to conclude that such a pole-zero pattern will ensure a phase shift in the range of $\pm 90°$.

LKY approach: Assume that $$\overline{G}(s) = \frac{b_1 s^{p-1} + b_2 s^{p-2} + \ldots + b_p}{s^p + a_1 s^{p-1} + \ldots + a_p} \qquad (34)$$

where $p = r + q$ is the number of the closed loop poles. The controller canonical state space realization of this transfer function is given by $$\dot{z} = A_{cl} z + B_{cl}(\tilde{W}^T \phi_f + \delta - \epsilon_f)$$

$$\tilde{y}_{ad} = C_{cl} z, \qquad (35)$$

where $$\dot{z} = A_{cl}z + B_{cl}(\tilde{W}^T\phi_f + \delta - \varepsilon_f)$$

$$\tilde{y}_{ad} = C_{cl}z, \quad (35)$$

where $$A_{cl} = \begin{bmatrix} -a_1 & -a_2 & \cdots & & -a_p \\ 1 & 0 & \cdots & & 0 \\ 0 & \ddots & \ddots & & \vdots \\ \vdots & & \ddots & \ddots & \vdots \\ 0 & \cdots & & 0 & 1 & 0 \end{bmatrix} \quad B_{cl} = \begin{bmatrix} 1 \\ 0 \\ 0 \\ \vdots \\ 0 \end{bmatrix}$$

$$C_{cl} = [b_1\ b_2\ \ldots\ b_p].$$

$\overline{G}(s)$ is SPR if and only if it complies with the Lefschetz-Kalman-Yakubovitz (LKY) Lemma, Ioannou, P. A. and Sun, J. (1996), *Robust Adaptive Control*, Prentice Hall, Inc., p. 129, i.e., there exists Q>0 such that the solution P of $$A_{cl}^T P + PA_{cl} = -Q \quad (36)$$

is positive definite and $$PB_{cl} = C_{cl}^T. \quad (37)$$

$\overline{G}(s)$ can be constructed utilizing the LKY condition as follows:

a) Choose Q>0 and solve Eq. (36) for P>0.
b) Using Eq. (37), compute $C_{cl}$, which in this canonical form is simply the first column of P. From Eqs. (33) and (34), the elements of $C_{cl}$ are also the coefficients of the numerator polynomial of $\overline{G}(s)$. Since $\overline{G}(s)$ is SPR, it is guaranteed that this numerator is Hurwitz.
c) Solve the numerator polynomial for its roots.

From the zeros obtained by either of the above methods, choose (r−1) of these to construct T(s), while the remaining q zeros makeup $N_{ad}(s)$. The fact that the numerator of $\overline{G}(s)$ is Hurwitz ensures also that T(s) and $N_{ad}(s)$ are individually Hurwitz. There is freedom in scaling T(s) and $N_{ad}(s)$, which could be utilized to normalize the maximum gain of $T^{-1}(s)$.

To summarize, $N_{dc}(s)/D_{dc}(s)$ is designed to stabilize the linearized system dynamics, while $N_{ad}(s)$ is constructed to meet the SPR condition needed for a realizable implementation.

Neural Network Adaptation Rule

As is evident from Eq. (31), the filter $T^{-1}(s)$ should operate on all the components of the NN vector ø. All these filters can be cast in one state space realization:

$$\dot{z}_f = A_f z_f + B_f \phi$$

$$\phi_f = C_f z_f, \quad (38)$$

where the diagonal blocks of the state space matrices ($A_f$, $B_f$, $C_f$) are constructed from a state space realization of the filter $T^{-1}(s)$. Since the filter is stable, $\exists P_f > 0$, satisfying $$A_f^T P_f + P_f A_f = -Q_f \quad (39)$$

for any positive definite $Q_f > 0$
The signals $\phi_f$ are used in the following NN W weight adaptation rule $$d\hat{W}/dt = -F[\tilde{y}_{ad}\phi_f + \lambda_w \hat{W}], \quad (40)$$

where F>0 and $\lambda_w > 0$ are the adaptation gains. In the next section it is proven that this adaptation rule ensures boundedness of the system error signals and the network weights. The NNAE 16 of FIG. 1 is depicted in more detail in FIG. 4.

Figure 4:
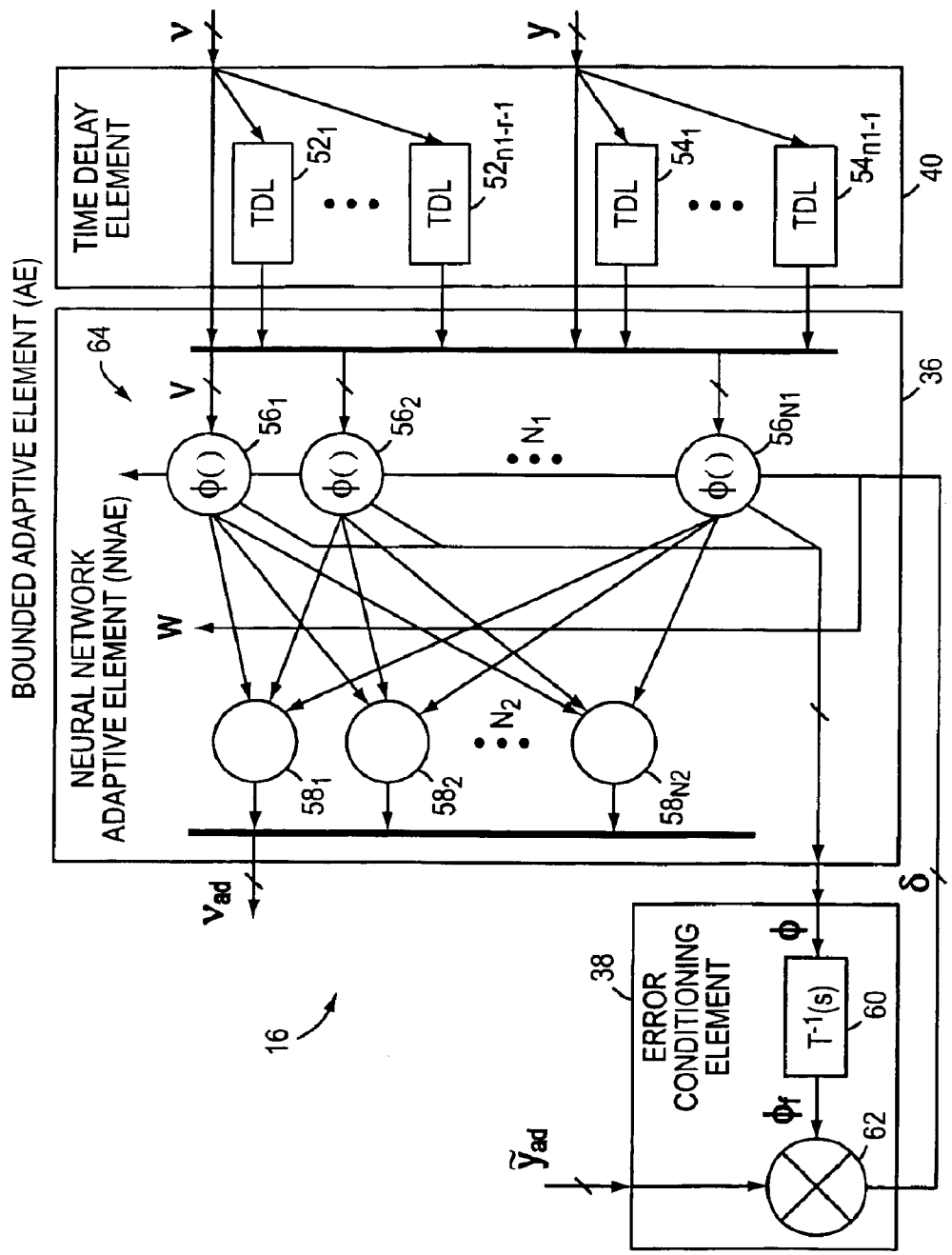
FIG. 4 is a relatively detailed view of an adaptive element.

FIG. 4 is an exemplary embodiment of the adaptive element 16 provided by way of example and not limitation as to possible implementations of the NNAE 16. The time delay element 40 comprises one or more time-delay (TDL) units $52_1$–$52_{n1-r-1}$ coupled to receive the pseudo-control signal v, and TDL units $54_1$–$54_{n1-1}$ coupled to receive the plant output signal y. The TDL units $52_1$–$52_{n1-r-1}$, $54_1$–$54_{n1-1}$ generate delayed versions $v_d$, $y_d$ of the signals v, y, and are coupled to supply these delayed signals $v_d$, $y_d$ as well as undelayed signals v, y, to the NNAE 36. The neural network (NN) 64 of the NNAE 36 multiplies the signals v, $v_d$, y, $y_d$ by respective weight data V and transmits the resulting signals to respective basis functions $\phi(\cdot)$ $56_1$, $56_2$, ..., $56_{N1}$. The basis functions $\phi(\cdot)$ $56_1$, $56_2$, ..., $56_{N1}$ are coupled to receive V-weighted signals v, $v_d$, y, $y_d$ and generate respective signals based thereon. The generated signals are multiplied by respective weight data W and summed at respective summation nodes $58_1$, $58_2$, ..., $58_{N2}$. The NNAE 36 is coupled to supply the resulting summed signals as the vector signal $v_{ad}$ to the summing node 22 of FIG. 1 for generation of the pseudo-control signal v.

To ensure boundedness of the basis functions $\phi(\cdot)$ $56_1$, $56_2$, ..., $56_{N1}$ and neural network weights V,W, the NNAE 36 is coupled to supply the basis functions $\phi(\cdot)$ $56_1$, $56_2$, ..., $56_{N1}$ as signals to the error conditioning element 38. The error conditioning element 38 comprises a filter 60 and a multiplier 62. The filter 60 operates on the basis functions $56_1$, $56_2$, ..., $56_{N1}$ with a filtering transfer function $T^{-1}(s)$ as previously described with respect to Equation (32) to generate filtered basis functions $\phi_f(\cdot)$. The filter 60 is coupled to supply the filtered basis functions $\phi_f(\cdot)$ to the multiplier 62. The multiplier 62 is also coupled to receive the transformed signal $y_{ad}$. The multiplier 62 generates the signal $\delta$ that is a vector product of the signals $\phi_f(\cdot)$, $y_{ad}$. The multiplier 62 is coupled to supply the signal $\delta$ to the NNAE 36. Based on the signal $\delta$, the NNAE 36 adjusts the weight data W to adapt the NNAE 36 to generate the pseudo-control signal so as to compensate for error Δ associated with the command control signal $\delta_c$.

4. Boundedness Statement

The following theorem establishes sufficient conditions for boundedness of the error signals and neural network weights in the proposed closed-loop adaptive output feedback architecture.

Theorem 2. Subject to assumptions 1–3, the error signals of the system comprised of the dynamics in Eq. (7), together with the dynamics associated with the realization of the controller in Eq. (14) and the NN adaptation rule in Eq. (40), are uniformly ultimately bounded, provided the following conditions hold $$Q_m > 2\|C_{cl}\|, \lambda_w > c^2/4, \quad (41)$$

where $Q_m$ is the minimum eigenvalue of Q.

Figure 5:
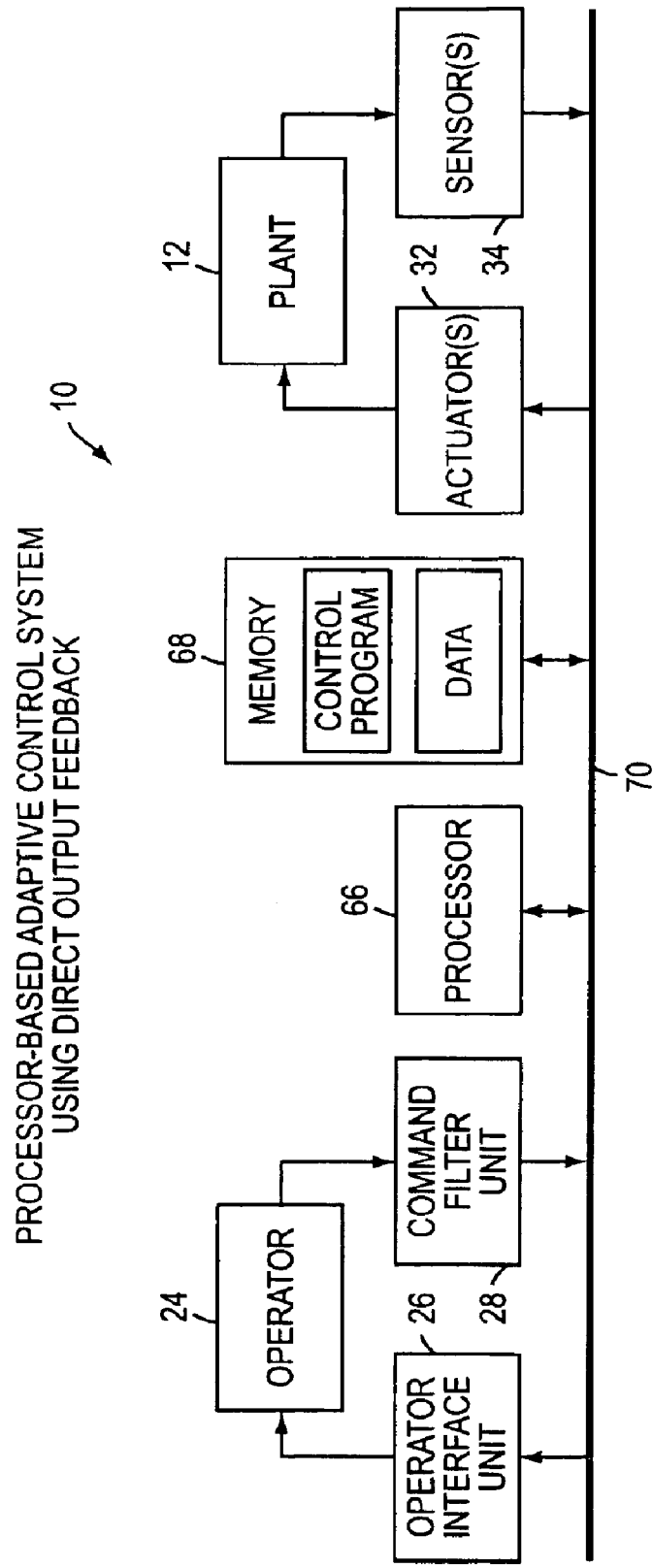
FIG. 5 is a block diagram of a processor-based adaptive control system using direct output feedback.

5. Processor-based Embodiment of Adaptive Control System Using Direct Output Feedback Although it is possible to implement the elements 14, 16, 18, 20, and 22 of the ACS 10 of FIG. 1 as discrete or grouped analog or digital devices, these elements can alternatively be implemented in a processor-based ACS system 10. The processor-based system 10 includes a processor 66 and memory 69 storing data and a control program, to implement the elements 14, 16, 18, 20, and 22. More specifically, the control program can be implemented as software objects or modules that perform the functions of the elements 14, 16, 18, 20, 22 as previously described. The data can be parameters such as the NN connection weights W, V and/or basis function(s) φ that are updated by the processor 66, as well as temporary data and intermediate calculations, commanded state signal levels, plant output signal levels, etc. The ACS 10 of FIG. 5 can further comprise bus 70 to which the operator interface unit 26, the command filter unit 28, the actuator 32, the sensor(s) 34, the processor 66, and the memory 68, are coupled.

In operation, the sensor(s) 34 generate plant output signal y and supply this signal to the operator interface unit 26 via the bus 70. The operation interface unit 26 generates a signal readable or discernible by the operator. If the operator 24 is human, the operator interface unit 26 can generate a display or the like based on the plant output state signal y. If the operator 24 is a processor or machine, the operator interface unit 26 can convert the plant output state signal y into a format usable by the operator. The operator 24 if human produces one or more signals through control actions applied to a command filter unit 28. For example, in the case of an aircraft, the control actions may be applied to control instruments of the aircraft. Alternatively, if the operator 24 is a machine, the command signal produced by the operator can be applied to the command filter unit 28. The command filter unit 28 generates the commanded output signal $y_c$ and the rth derivative of the commanded output signal $y_c^{(r)}$. The command filter unit 28 supplies the signals $y_c$, $y_c^{(r)}$ to the processor 66 or to the memory 68 at a location accessible to the processor 66. The sensor(s) 34 can supply the plant output signal y directly to the processor 66, or to the memory 68 at a location accessible to the processor 66 via the bus 70. The processor 66 performs the functions of the elements 14, 16, 18, 20, 22 to generate a command control signal $δ_c$. The processor 66 is coupled to supply the command control signal $δ_c$ to the actuator(s) 32 via the bus 70. The actuator(s) 32 perform control of the plant 12 in a manner that can affect the plant state(s). The sensor(s) 34 sense and generate the plant output signal y for the next control cycle. Processing performed by the processor 66 in executing its control program can be repeated over successive control cycles as long as required to control the plant 12.

6. General Method of the Invention

Figure 6:
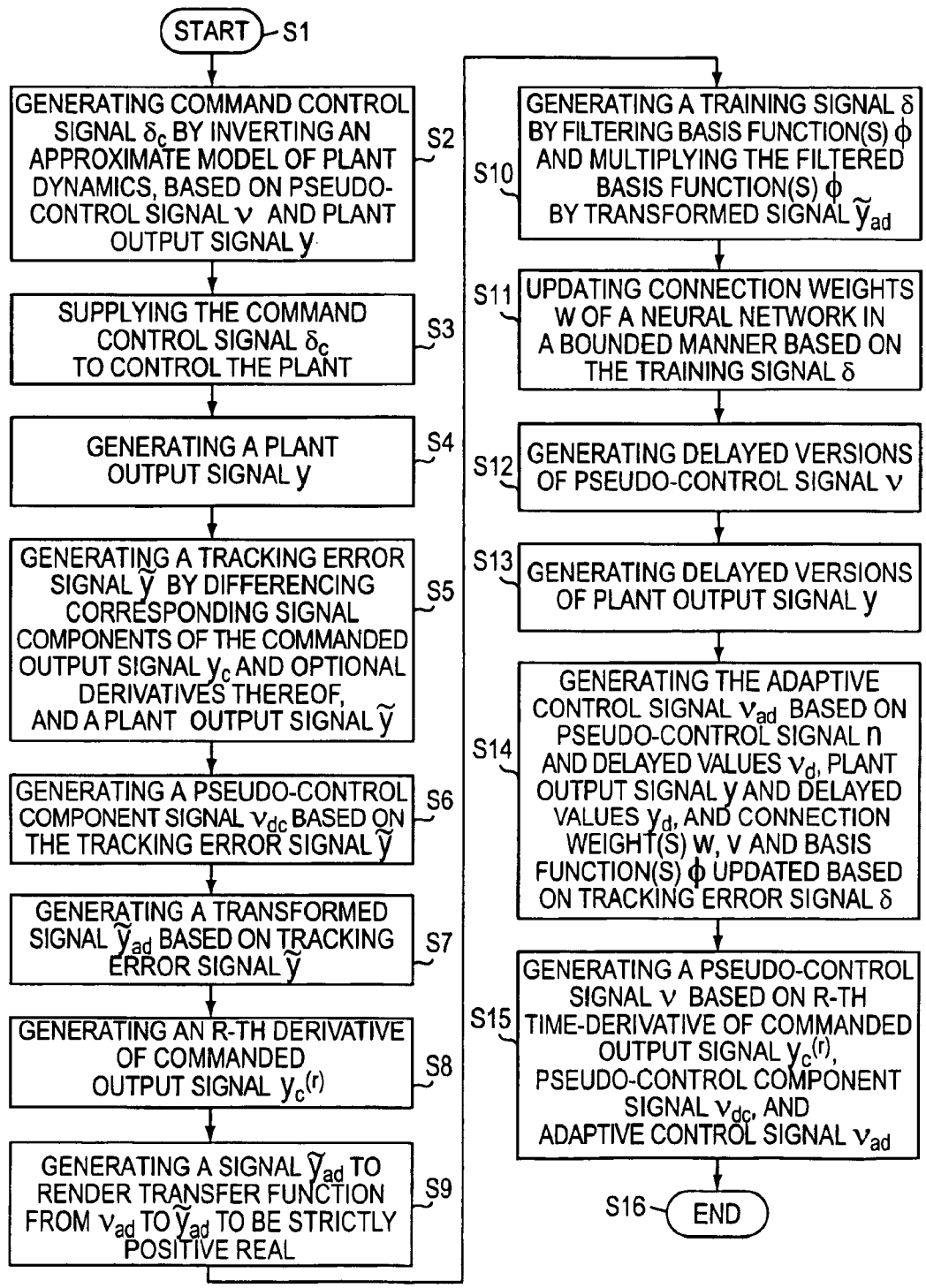
FIG. 6 is a flowchart of a general method of the invention.

FIG. 6 is a flowchart of processing performed by the ACS 10 of FIGS. 1–5. In step S1 of FIG. 6 the method begins. In step S2 a command control signal $δ_c$ is generated by inverting an approximate model of the plant dynamics, based on a pseudo-control signal v and the plant output signal y. In step S3 the command control signal $δ_c$ is supplied to control the plant. In step S4 the plant output signal y is generated the sensors. In step S5 a tracking error signal ỹ is generated by differencing corresponding signal components of the commanded output signal $y_c$ and optional derivative(s) thereof, and the plant output signal y. In step S6 a pseudo-control component signal $v_{dc}$ is generated based on the tracking error signal ỹ using the transfer function $N_{dc}(s)/D_{dc}(s)$. In step S7 a transformed signal (Note change here)$ỹ_{ad}$ is generated based on the tracking error signal ỹ using transfer function $N_{ad}(s)/D_{dc}(s)$. In step S8 the rth derivative of the commanded output signal $y_c^{(r)}$ is generated. In step S9 the signal $ỹ_{ad}$ is generated to render the transfer function from the signal $v_{ad}$ to the signal $ỹ_{ad}$ strictly positive real by appropriate choice of $N_{ad}(s)$. In step S10 a training signal δ is generated by filtering basis function(s) φ and multiplying the filtered basis function(s) φ by the transformed signal $y_{ad}$. In step S11 connection weights W of a neural network are updated in a bounded manner using the training signal δ. In step S12 delayed versions of the pseudo-control signal v are generated. In step S13 delayed versions of the plant output signal y are generated. In step S14 the adaptive control signal $v_{ad}$ is generated based on the pseudo-control signal v, delayed versions $v_d$ of the signal v, plant output signal y, plant output signal $y_d$, connection weights W, V, and basis function(s) φ updated based on the training error signal δ. In step S15 a pseudo-control signal v is generated based on the rth time-derivative of the commanded output signal $y_c^{(r)}$ pseudo-control component signal $v_{dc}$, and adaptive control signal $v_{ad}$. In step S16 the method of FIG. 6 ends.

7. Example of Implementation of the Adaptive Control System Having Direct Output Feedback Control The performance of the ACS 10 using output feedback is demonstrated by considering the following nonlinear system, consisting of a modified Van der Pol oscillator coupled to a lightly damped mode $$\dot{x}_1 = x_2 \tag{42}$$

$$\dot{x}_2 = -2(x_1^2-1)x_2 - x_1 + u \tag{43}$$

$$\dot{x}_3 = x_4 \tag{44}$$

$$\dot{x}_4 = -x_3 - 0.2x_4 + x_1 \tag{45}$$

$$y = x_1 + x_3 \tag{46}$$

The output y has a relative degree of r=2. From a practical perspective, the system can be thought of as a second order nonlinear plant model, whose realization consists of states $x_1$ and $x_2$, in which the output is modeled as $y=x_1$. However, the system contains also a very lightly damped unmodeled mode, with a natural frequency equal to that of the linearized plant. This mode is excited by the plant displacement state ($x_1$) and is coupled to the measurement.

The output signal y does not have a full relative degree in the presence of the unmodeled mode. The low natural frequency of this mode is encompassed by the bandwidth of the controlled system. This introduces a challenging control problem, in particular for methods that require the output to have a fall relative degree. Moreover, this example is treated as if even the Van der Pol model is unknown, and only the fact that r=2 is given. This is not an unreasonable assumption in that in many systems, the number of plant states and hence the value of r can be deduced from knowledge of the behavior of the plant. Thus, the controller design is performed assuming ÿ=u, implying that in FIG. 1 the plant transfer function from the pseudo-control signal v to y is $1/s^2$.

A first order lead-lag compensator was selected to stabilize the associated error dynamics. In addition, the first design approach described in Section 3.5 was used to satisfy the SPR condition. The resulting two outputs of the compensator are given by $$\left\{ \begin{array}{c} v_{dc}(s) \\ \tilde{y}_{ad}(s) \end{array} \right\} = \frac{1}{s+5} \left[ \begin{array}{c} 8(s+0.75) \\ 20(s+1) \end{array} \right] \tilde{y}(s) \tag{50}$$

which places the closed loop poles of the error dynamics at $-3,-1\pm j$. The low pass filter 60 $T^{-1}(s)$ discussed in Eq. (26) was chosen as $$T^{-1}(s) = \frac{1}{0.5s+1}. \quad (51)$$

It is easy to verify that the transfer function G(s)T(s) of Eq. (31) is SPR.

A Gaussian Radial Basis Function (RBF) NN with only three neurons and a bias term was used in the adaptive element. The functional form for each RBF neuron was defined by $$\phi_i(\eta) = e^{-(\eta-\eta_{ci})^T(\eta-\eta_{ci})/\sigma^2}, \sigma=\sqrt{2}, i=1,2,3. \quad (52)$$

The centers $\eta_{ci}$, i=1,2,3 were randomly selected over a grid of possible values for the vector $\eta$. All of the NN inputs were normalized using an estimate for their maximum values. The current and two delayed values for the plant output signal y and only the current pseudo-control signal v were used in the input vector to the neurons. The complete input vector consisted of these values together with a bias term, as illustrated in FIG. 4. Thus, there are a total of four NN weights in Eq. (29). The network gains were F=50 and $\lambda_w=1$.

In the simulation, the initial states of the system were set to $x_1(0)=0.5$, $x_2(0)=2.5$, $x_3(0)=x_4(0)=0$. The system was commanded to follow the output of a second order reference model for the MIU 18, designed with a natural frequency of $\omega_n=1$[rad/sec] and damping $\zeta=2/\sqrt{2}$, and driven by a square wave input command signal $y_c$.

Figure 7:
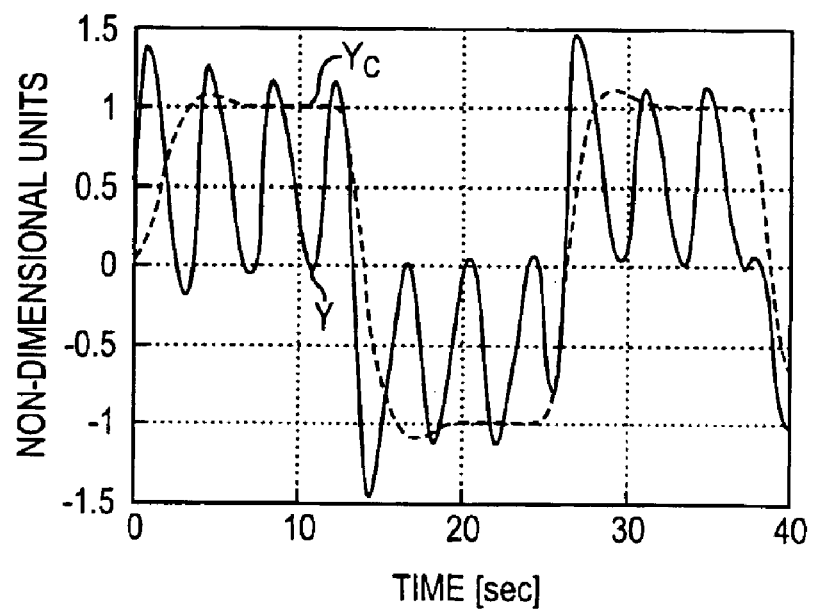
FIG. 7 is a graph of commanded output signal $y_c$ (broken line) and plant output signal y (solid line) versus time for a control system without unmodelled dynamics using only a linear compensator to control a plant.
Figure 8A:
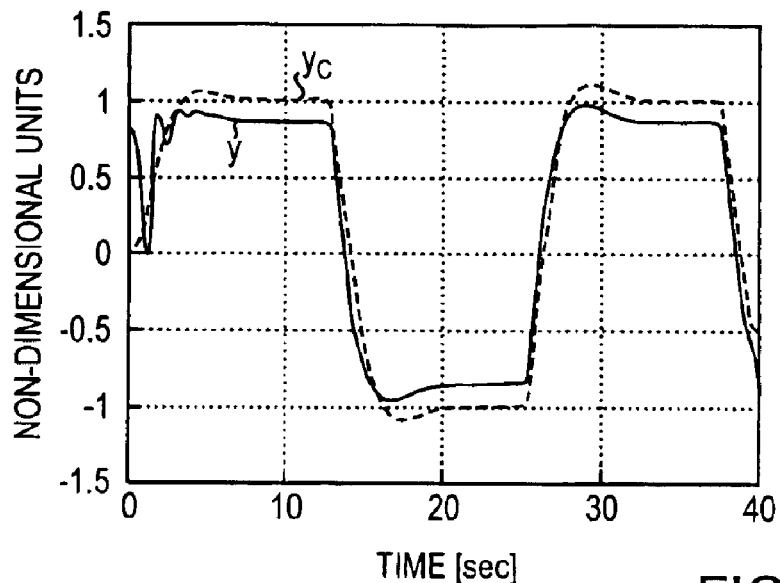
FIG. 8A is a graph of commanded output signal $y_c$ (broken line) and plant output signal y (solid line) versus time for a control system without unmodelled dynamics and with the adaptive element.
Figure 8B:
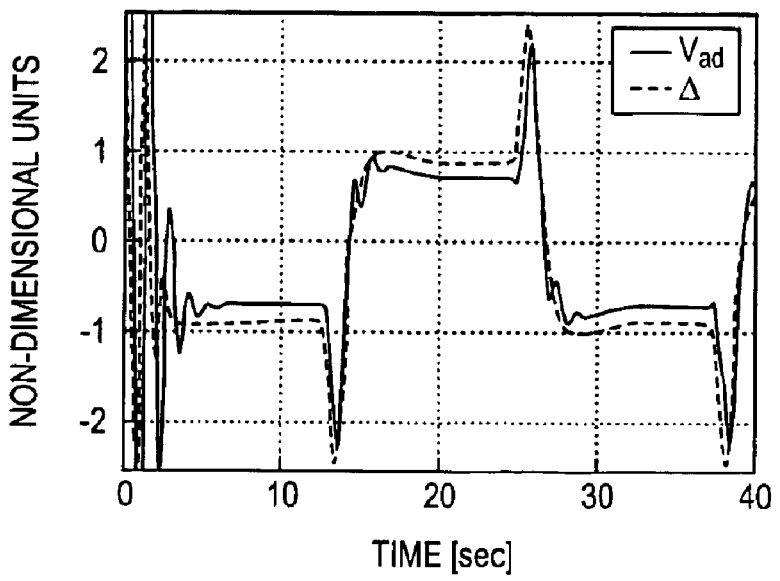
FIG. 8B is a graph of adaptive control signal $v_{ad}$ and inversion error signal Δ for a control system without unmodelled dynamics and with the adaptive element.

First, the controlled system performance is evaluated without the unmodeled mode dynamics, i.e., removing Eqs. (44) and (45) and setting the output $y=x_1$. However, it will be recalled that the controller has been designed given only the fact that r=2. FIG. 7 compares the system response without NN augmentation (solid line) with the reference model output (dashed line), clearly demonstrating the almost unstable oscillatory behavior caused by the nonlinear elements in the Van del Pol equation. FIGS. 8A and 8B show that with NN augmentation, these oscillations are eliminated after a period of about three seconds. This is accounted for by the successful identification of the model inversion error by the NN, which is also illustrated in FIG. 8B by comparing the NN output (solid line) with the computed inversion error (dashed line).

Next, the effect of the unmodelled dynamics is examined. In this case, the response without the NN is unstable, and therefore is not shown. The response with NN augmentation is presented in FIG. 9. It shows only minor performance degradation compared to the full relative degree case of FIG. 8A. Since the unmodeled mode is well within the bandwidth of the control system (when viewed with $v_{ad}=\Delta$), this demonstrates that the adaptive system learns to interact with the added mode to achieve good tracking performance.

Figure 9:
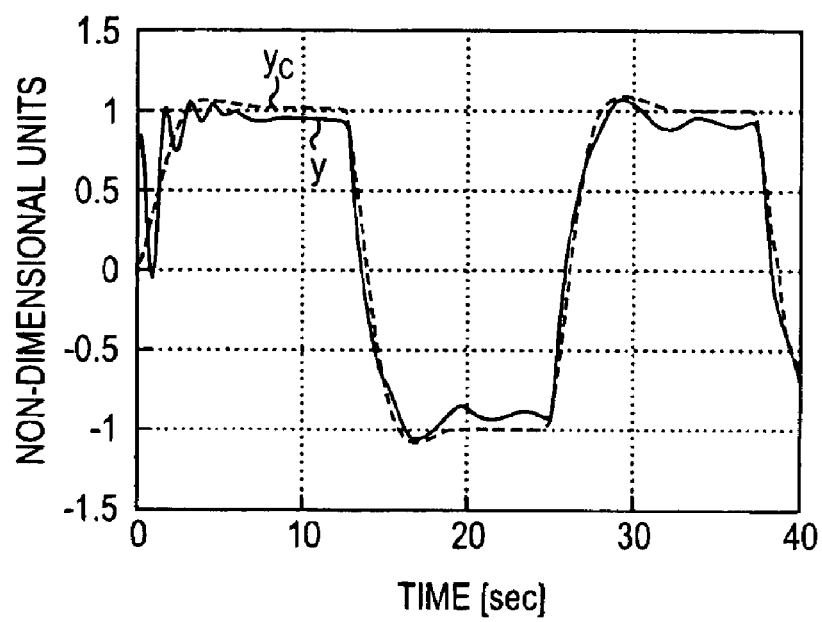
FIG. 9 is a graph of commanded output signal $y_c$ (broken line) and plant output signal y (solid line) versus time for a control system with unmodelled dynamics and with the adaptive element.
Figure 10A:
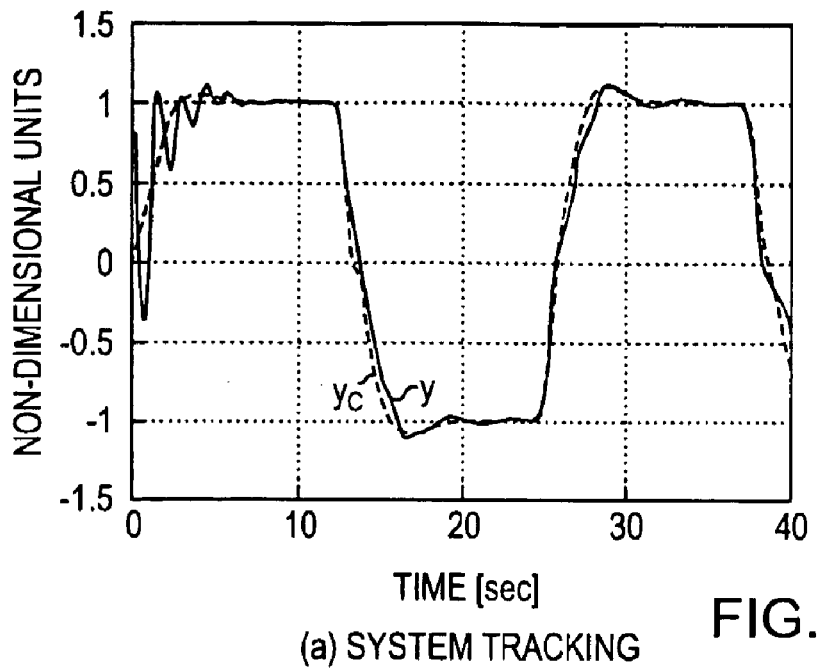
FIG. 10A is a graph of commanded output signal $y_c$ (broken line) and plant output signal y (solid line) versus time for a control system with unmodelled dynamics, and with the adaptive element; and with the linear controller.
Figure 10B:
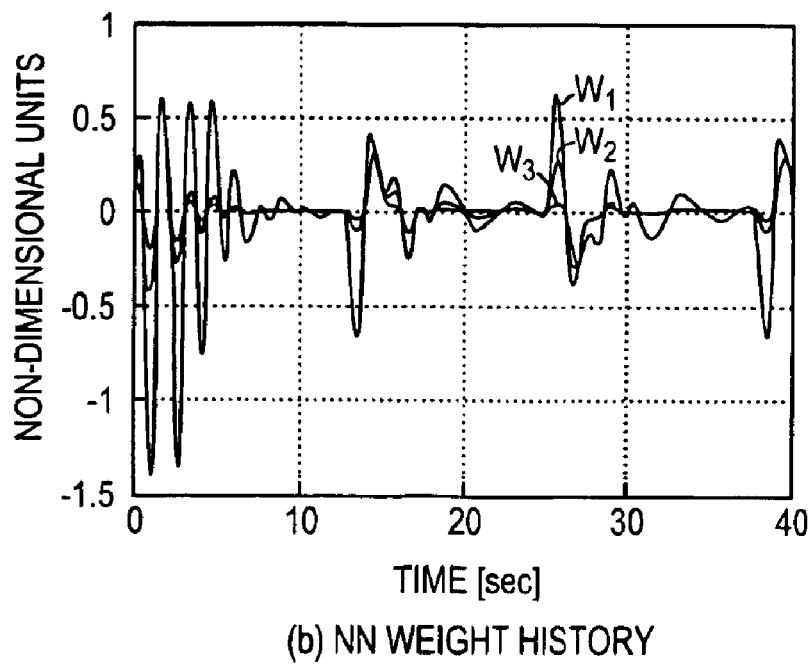
FIG. 10B is a graph of commanded output signal $y_c$ (heavy line), plant output signal y (line with relatively moderate oscillations), and connection weights W (line with relatively heavy oscillations) versus time for a control system with unmodelled dynamics and with an adaptive neural network element and linear controller.

In FIGS. 8A, 8B, 9 the NN based adaptive controller exhibits a steady state tracking error. This error can be removed by introducing an additional integral control action when designing the linear compensator. The performance of the controller with integral action is shown in FIGS. 10A and 10B. The steady state tracking error is zero, while the transient response behavior is only slightly compromised. The bounded NN weight time histories are also depicted in this figure, showing that most of the weight adaptation takes place when the command reverses direction.

8. Additional Considerations

The stability results are semiglobal in the sense that they are local with respect to the domain D. If the NN universally approximates the inversion error over the whole space $\Re^{n+1}$ then these results become global.

The NN update laws consist of a modified gradient algorithm along with the standard a-modification term as described in the Kim and Lewis 1998 publication. These laws have been proven to be passive in Lewis, F. (1999), Nonlinear network structures for feedback control, *Asian Journal of Control*, 1(4):205–228.

The NN learning takes place on-line, and no off-line training is required. No assumption on persistent excitation is required.

The ultimate bound for the tracking error can be made smaller by increasing the linear design gains. This will result in increased interaction with unknown or unmodeled plant dynamics. However, Theorem 2 remains valid so long as assumptions 2 and 3 hold.

In the case of plants of unknown dimension but with known relative degree, the described methodology applies with a slight modification of the input vector to the network: a large range of input/output data should be used, i.e., $n_1 >> n$.

9. Conclusion

The described ACS 10 presents an adaptive output feedback control design procedure for nonlinear systems, that avoids state estimation. The main advantage is that the stability analysis permits systems of arbitrary but known relative degree. The full dimension of the plant and its internal dynamics may be known or poorly modeled. Only mild restrictions regarding observability and smoothness are imposed. Consequently, the result is applicable to adaptive control of nonlinear systems with parametric uncertainty and unmodeled dynamics.

Any trademarks listed herein are the property of their respective owners, and reference herein to such trademarks is intended only to indicate the source of a particular product or service.

The many features and advantages of the present invention are apparent from the detailed specification and it is intended by the appended claim to cover all such features and advantages of the described methods and apparatus which follow in the true scope of the invention. Further, since numerous modifications and changes will readily occur to those of ordinary skill in the art, it is not desired to limit the invention to the exact implementation and operation illustrated and described. Accordingly, all suitable modifications and equivalents may be resorted to as falling within the scope of the invention.

What is claimed is:

1. An adaptive control system (ACS) for controlling a plant based on at least one commanded output signal $y_c$ and an rth time-derivative of the commanded output signal $y_c^{(r)}$, and a plant output signal y that is a function of the states existing in the plant, r being the relative degree of the plant output signal y, the ACS comprising:

a model inversion unit (MIU) coupled to receive a pseudo-control signal v and a plant output signal y, the MIU generating a control signal $\delta_c$ by inverting an approximate model of the plant dynamics, the MIU supplying the control signal $\delta_c$ to the plant for control thereof;

a summing unit coupled to receive the rth time-derivative of the commanded output signal $y_c^{(r)}$, a pseudo-control component signal $v_{dc}$, and an adaptive control signal $v_{ad}$, the summing unit adding the rth time-derivative of the commanded output signal $y_c^{(r)}$ and the pseudo-control component signal $v_{dc}$, and subtracting the adaptive control signal $v_{ad}$, to generate the pseudo-control signal v;

an error signal generator (ESG) coupled to receive the commanded output signal $y_c$ and optional derivatives thereof and the plant output signal y, the ESG generating a tracking error signal $\tilde{y}$ by differencing corresponding signal components of the commanded output signal $y_c$ and optional derivatives thereof, and a plant output signal y;

a linear controller having a linear dynamic compensator (LDC) coupled to receive the tracking error signal $\tilde{y}$, the LDC generating the pseudo-control component signal $v_{dc}$ based on the tracking error signal $\tilde{y}$, the pseudo-control component signal $v_{dc}$ for stabilizing the feedback linearized dynamics of the model inverted in the MIU, the LDC generating a transformed signal $\tilde{y}_{ad}$ based on the tracking error signal $\tilde{y}$ so that a transfer function from an adaptive control signal $v_{ad}$ to the transformed signal $\tilde{y}_{ad}$ is strictly positive real (SPR);

an adaptive element having
an error conditioning element coupled to receive the transformed signal $\tilde{y}_{ad}$ and at least one neural network basis function $\phi$, the error conditioning element stable low-pass filtering the basis function $\phi$ to produce a filtered basis function $\phi_f$ and multiplying the filtered basis function $\phi_f$ by the transformed signal $\tilde{y}_{ad}$ to produce a training signal $\delta$; and a neural network adaptive element (NNAE) coupled to receive the plant output signal y, the pseudo-control signal v, and the training signal $\delta$, the NNAE having a neural network generating the adaptive control signal $v_{ad}$ based on the plant output signal y and the pseudo-control signal v supplied as inputs to the neural network, the neural network generating the adaptive control signal $v_{ad}$ by mapping the plant output signal y and a pseudo-control signal v to the adaptive control signal $v_{ad}$ based on at least one basis function $\phi$ and at least one connection weight W, the neural network couple to output the basis function $\phi$ to the error conditioning element, the adaptive element using the training signal $\delta$ to update the basis function $\phi$ and at least one connection weight W of the neural network so that the adaptive control signal $v_{ad}$ generated by the neural network is bounded.

2. An ACS as claimed in claim 1 wherein the LDC maps the tracking error signal $\tilde{y}$ to the pseudo-control component signal $v_{dc}$ based on a transfer function $N_{dc}(s)/D_{dc}(s)$, and the LDC maps the tracking error signal $\tilde{y}$ to the transformed signal $\tilde{y}_{ad}$ based on a transfer function $N_{ad}(s)/D_{dc}(s)$, the transfer functions $N_{dc}(s)/D_{dc}(s)$ and $N_{ad}(s)/D_{dc}(s)$ selected to assure boundedness of the tracking error signal $\tilde{y}$.

3. An ACS as claimed in claim 1 further comprising:
a delay element coupled to receive the plant output signal y and generating at least one delayed plant output signal $y_d$ as an additional input signal to the neural network to generate the adaptive control signal $v_{ad}$.

4. An ACS as claimed in claim 1 further comprising:
a delay element coupled to receive the pseudo-control signal v and generating at least one delayed pseudo-control signal $v_d$, the delay element coupled to supply the delayed pseudo-control signal $v_d$ as an additional input signal to the neural network to generate the adaptive control signal $v_{ad}$.

5. An ACS as claimed in claim 1 wherein the plant comprises at least one sensor sensing at least one state of the plant, and generating the plant output signal y based on the sensed plant state.

6. An ACS as claimed in claim 1 wherein the plant comprises at least one actuator controlling the plant based on the command control signal $\delta_c$.

7. An ACS as claimed in claim 1 wherein the ACS is operated by a human operator, the ACS further comprising:
an operator interface unit coupled to receive the plant output signal y, the operator interface unit generating a display signal based on the plant output signal y;

the operator receiving the display signal from the operator interface unit, and producing control action to control the plant based on the display signal; and a command filter unit operable by the operator, the command filter unit generating the commanded output signal $y_c$, and optional derivatives thereof, and the rth derivative $y_c^{(r)}$ of the plant output signal y based on control action of the operator.

8. An ACS as claimed in claim 1 further comprising:
an operator interface unit coupled to receive the plant output signal y, the operator interface unit generating a signal based on the plant output signal y;

an operator coupled to receive the signal generated by the operator interface unit, and generating an operator signal to control the plant based on the signal generated by the operator interface unit; and a command filter unit operable by the operator, the command filter unit generating the commanded output signal $y_c$ and optional derivatives thereof, and the rth derivative $y_c^{(r)}$ of the plant output signal y based on the operator signal.

9. An adaptive element (AE) of an adaptive control system (ACS) for controlling a plant based on a plant output signal y that is a function of the full plant state existing in a plant, a pseudo-control signal v used to control the plant, and a transformed signal $\tilde{y}_{ad}$ from a linear controller of the ACS, the adaptive element comprising:

a neural network adaptive element (NNAE) comprising a neural network having at least one connection weight W and at least one basis function $\phi$, the neural network coupled to receive the pseudo-control signal v and the plant output signal y;

a delay element coupled to receive the plant output signal y and the pseudo-control signal v, and generating signals $y_d$, $v_d$ that are delayed versions of the plant output signal y and the pseudo-control signal v; and an error conditioning element coupled to receive the transformed signal $\tilde{y}_{ad}$ and the basis function $\phi$, and generating an error signal $\delta$ based thereon, the NNAE coupled to receive the error signal $\delta$ and adapting the connection weight W and the basis function $\phi$ to adaptively control unmodeled plant dynamics.

10. An adaptive element as claimed in claim 9 wherein the error conditioning element includes a filter and a multiplier, the filter operating on the basis function $\phi$ from the NNAE to produce a filtered basis function $\phi_f$, the multiplier generating the error signal $\delta$ by multiplying the filtered basis function $\phi_f$ by the transformed signal $\tilde{y}_{ad}$.

11. An adaptive element as claimed in claim 10 wherein the filter operates on the basis function $\phi$ to produce the filtered basis function $\phi_f$ using a transfer function $T^1(s)$ that ensures boundedness of the connection weight W and a tracking error signal $\tilde{y}$ generated by differencing a commanded output signal $y_c$ and the plant output signal y, the tracking error signal $\tilde{y}$ provided to the linear controller of the ACS to generate the transformed signal $\tilde{y}_{ad}$ and the pseudo-control signal v.

* * * * *

UNITED STATES PATENT AND TRADEMARK OFFICE
CERTIFICATE OF CORRECTION

PATENT NO. : 6,904,422 B2
DATED : June 7, 2005
INVENTOR(S) : Calise et al.

It is certified that error appears in the above-identified patent and that said Letters Patent is hereby corrected as shown below:

Column 19,
Line 24, "$\Phi_r$" should read -- $\Phi_f$ --.

Signed and Sealed this

Sixteenth Day of August, 2005

JON W. DUDAS
*Director of the United States Patent and Trademark Office*